March 30, 1948.    J. E. BOWERS    2,438,534
TRANSPORTATION VEHICLE
Filed July 12, 1944    3 Sheets-Sheet 1
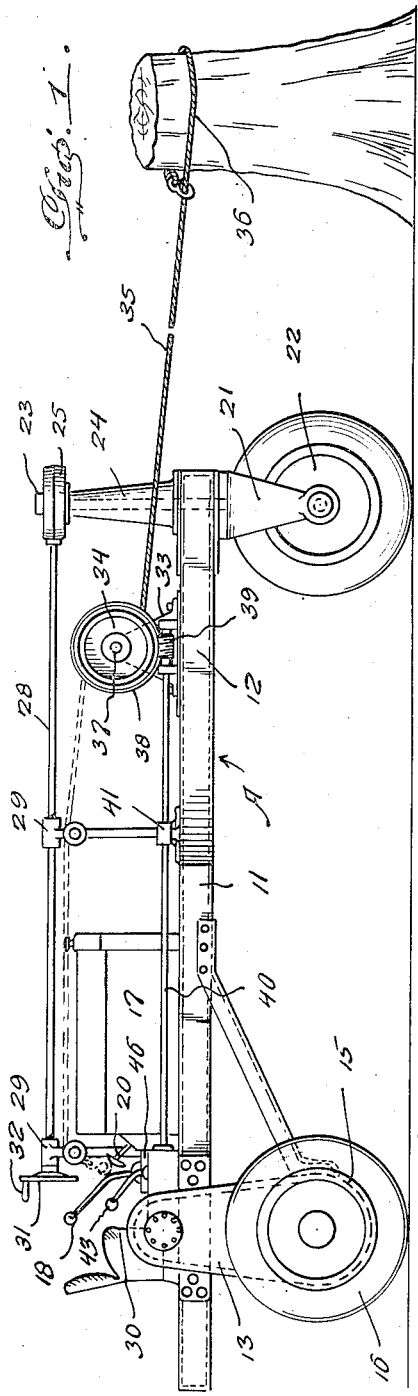
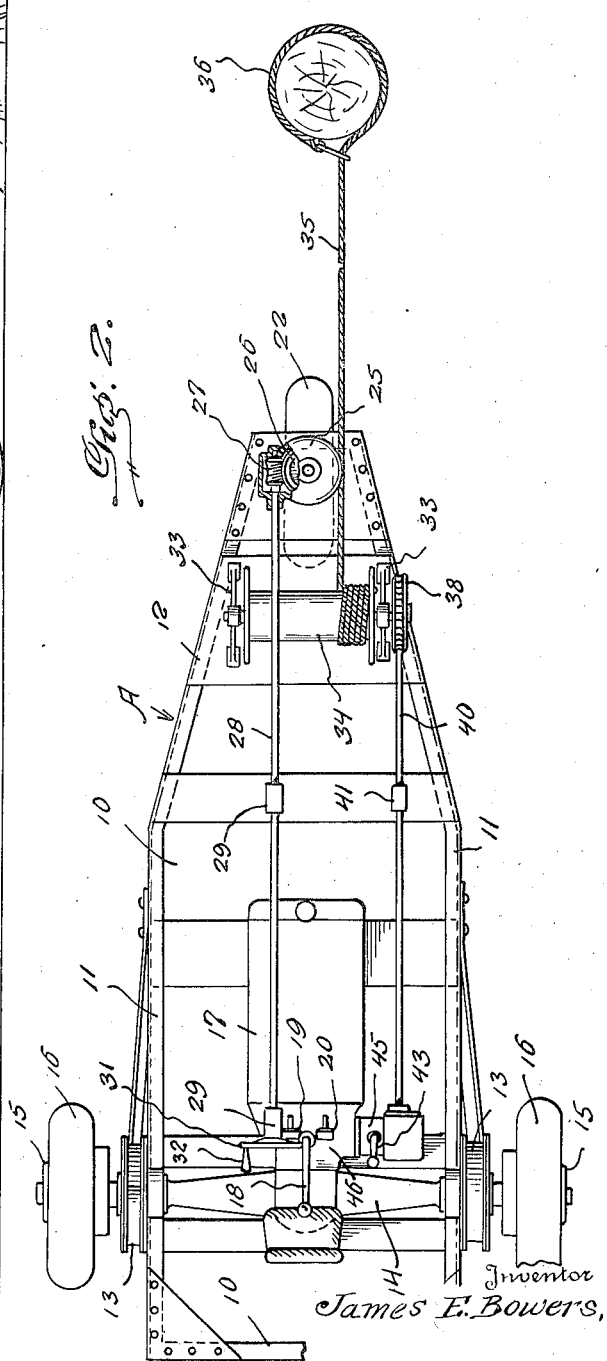
Inventor
James E. Bowers,
By
Attorney

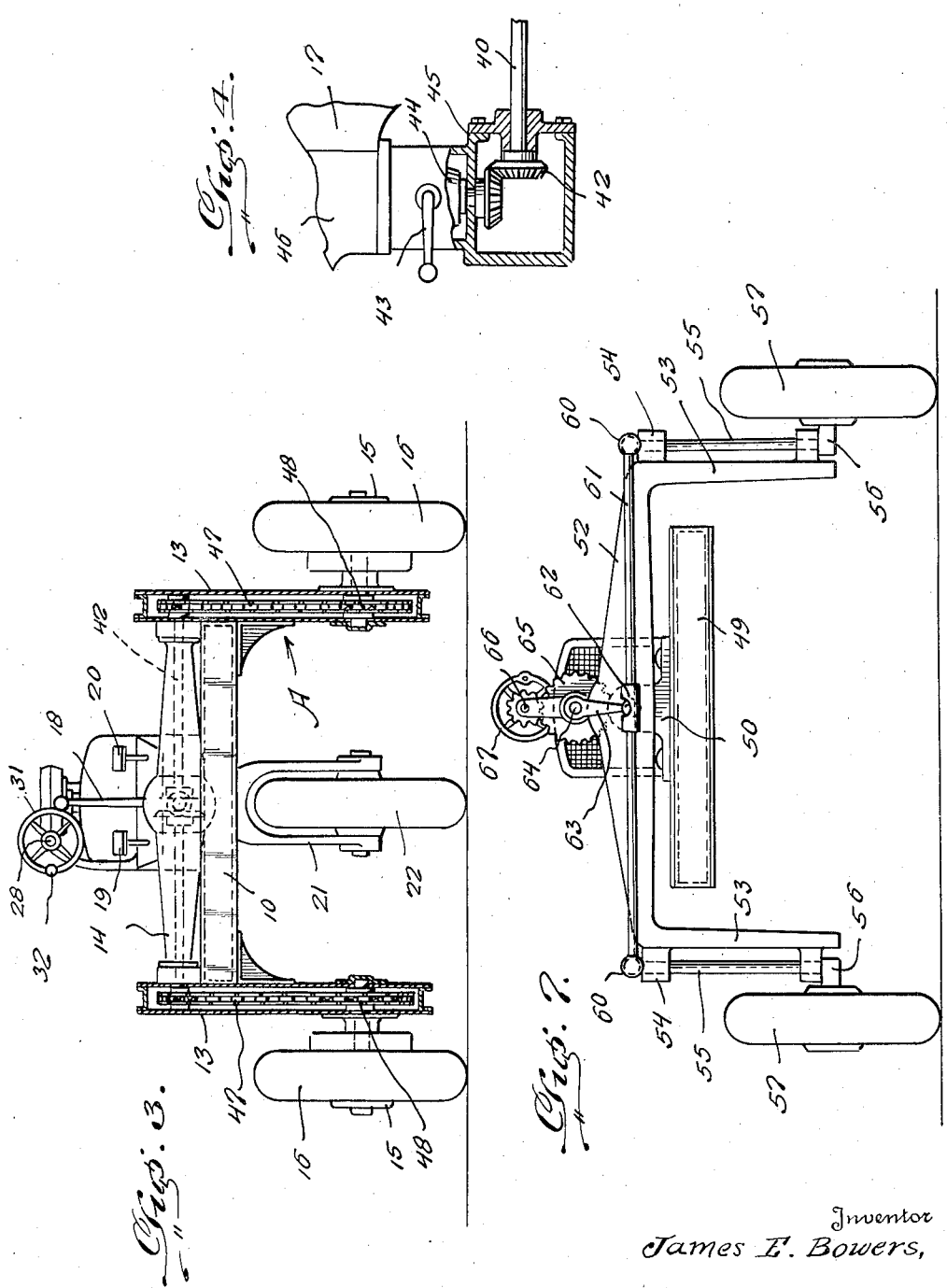

March 30, 1948. J. E. BOWERS 2,438,534
TRANSPORTATION VEHICLE
Filed July 12, 1944 3 Sheets-Sheet 3
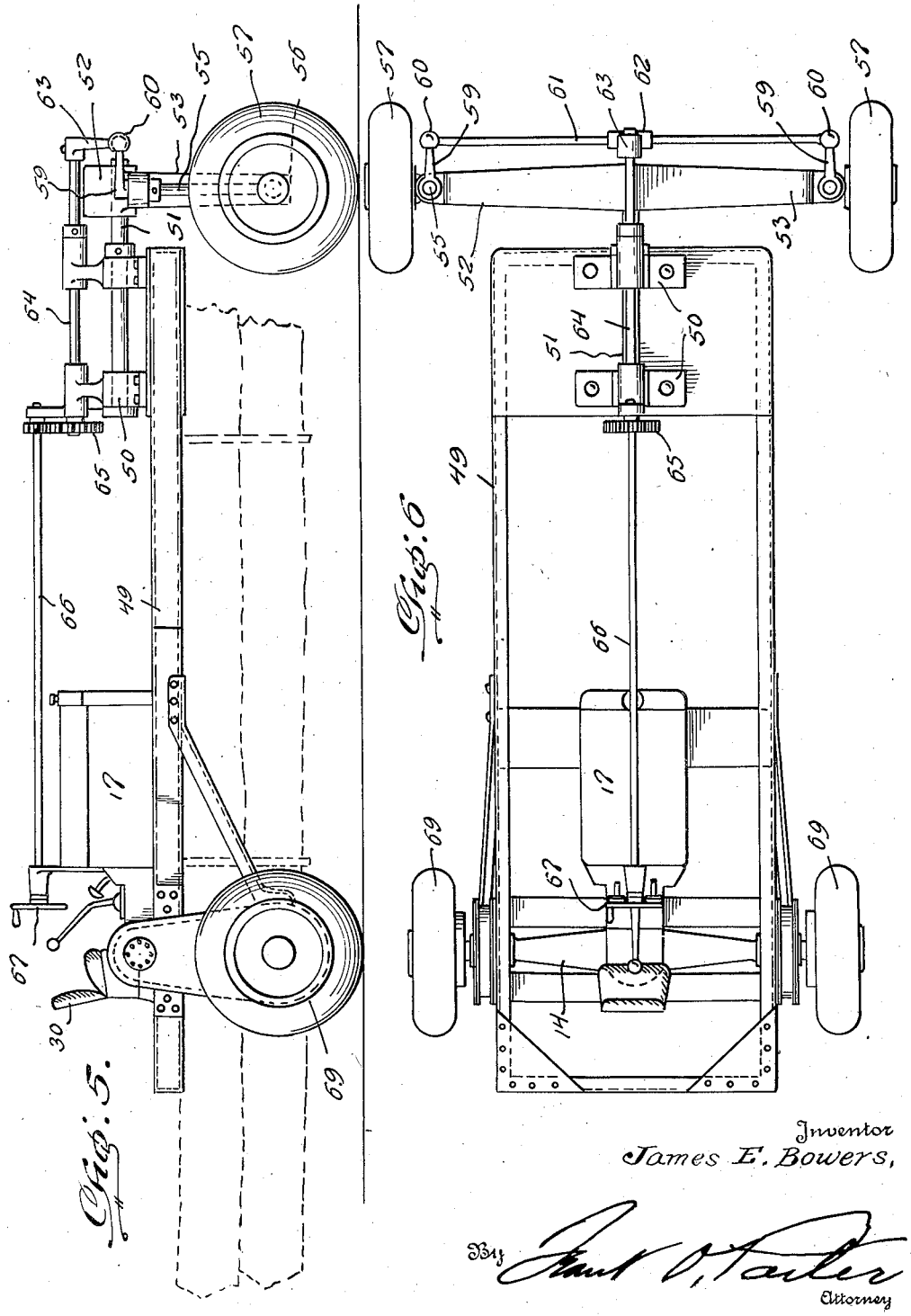
Inventor
James E. Bowers, Patented Mar. 30, 1948

2,438,534

UNITED STATES PATENT OFFICE 2,438,534

TRANSPORTATION VEHICLE

James E. Bowers, Allentown, Ga.

Application July 12, 1944, Serial No. 544,526

2 Claims. (Cl. 180—54)

The invention relates to a transportation vehicle, and more especially to a logging truck or cart.

The primary object of the invention is the provision of a vehicle of this character, wherein logs can be conveniently and expeditiously transported from the woods to a mill, so that the said logs may be cut up for lumber or other purposes, the vehicle being of novel construction and unique in its arrangement of its parts, so as to be compact and to assure safe and handy transportation of the load handled thereby.

Another object of the invention is the provision of a vehicle of this character, wherein the construction thereof is such that it can haul anything that can be suspended within its dimensions, the vehicle being freely flexible to afford pendulum suspension of the load without any binding action on the latter, and to prevent body strain, especially when driving or traveling over irregular surfaces and the ground.

A further object of the invention is the provision of a vehicle of this character, wherein it is of a self-propelled type, with pneumatic tires, the motor, transmission, steering assembly being self-contained, and requires no auxiliary draw bar horse power operation, and the load carried by the vehicle is straddled for underslung carriage thereof in transit by such vehicle until tripped by an operator.

A still further object of the invention is the provision of a vehicle of this character, wherein it is equipped with a winch for use in drawing the vehicle from a mud or bog hole, and also for drawing lumber or log loads to a sufficient height for transportation and bunching thereof.

A still further object of the invention, is the provision of a vehicle of this character, which is simple in construction, thoroughly reliable and efficient in operation, strong, durable, readily and easily handled, steady in the travel thereof, possessed of maximum load capacity, manually controlled with minimum labor requirements, and inexpensive to manufacture.

With these and other objects in view the invention consists in the features of construction, combination and arrangement of parts as will be hereinafter more fully described, illustrated in the accompanying drawings, which show the preferred and modified forms of construction thereof, and pointed out in the claims hereunto appended.

In the accompanying drawings:

Figure 1 is a side elevation of the vehicle constructed in accordance with the invention, with the winch in operating position.

Figure 2 is a top plan view, partly broken away.

Figure 3 is a rear elevation.

Figure 4 is a detail top plan view, partly in section or partly broken away, showing the winch control.

Figure 5 is a side view of a modified form of vehicle constructed in accordance with the invention.

Figure 6 is a top plan view of the same.

Figure 7 is a front view thereof.

Similar reference characters indicate corresponding parts throughout the several views in the drawings.

Referring to the drawings in detail A designates generally the preferred embodiment of the invention in its entirety, as illustrated in Figures 1, 2, 3 and 4, and in this particular comprises a main body frame or chassis frame 10, having the fore portions of the side sills 11 thereof forwardly converging to effect a tapered front end 12, while these side sills aft are parallel with each other, which effect the rear end of such frame 10, and the fore and aft portions of the latter give the required length to the vehicle A.

At the aft portion of the frame 10, outside of the sills 11 are upright or vertical housings 13, which have their upper portions rising above the plane of the frame 10 and here join with a rear differential axle housing 14 secured horizontally crosswise of the frame 10 in any suitable manner. At the lower portions of the housing 13 are located the rear wheels 15, having pneumatic tires 16, and these wheels 15 are the power mediums for the vehicle, they having suitable connections, not shown, with a power motor or unit 17. Interposed in these connections is a transmission mechanism, not shown, controlled by a hand shift lever 18, and foot operated clutch pedal 19, respectively, there also being a brake pedal 20 in associated relation to the pedal 19. The power motor or unit 17 can be of any selected type suitable for the vehicle A.

At the tapered front end 12 of the frame 10 is a steering fork 21 having therein the front steering wheel 22, and the upper turning stem 23 of this fork 21 fits within an upright column or post 24 fixed to and rising from the end 12. The column or post 24 is formed with a sectional head 25 creating a casing for a worm gear 26 with which meshes a worm pinion 27, the gear 26 being fixed to the stem 23, while the pinion 27 is on a steering or turning rod 28, the latter being extended rearwardly through suitable bearings 29 adjacent to an operator's seat 30 at the rear end of the frame 10. The rod 28 at its rear end carries a hand steering wheel 31, having the hand hold 2.

At the fore of the frame 10 in rear of the post or column 24 is a winch stand 33 having trunnioned therein a cable winch 34 on which is adapted to be wound and unwound a draw cable 35, having at its outer end a looping gadget 36, the winch arbor 37 being driven by a worm gear 38 meshing with a companion pinion 39 on a turning or power shaft 40 supported in bearings 41. The shaft 40 has gear connections 42 with the driving adjuncts of the power motor or unit 17, the gear connections 42 being controlled by a hand control lever 43 for actuating a throw out clutch mechanism 44, which with the connections 42 are contained within a supplemental housing 45 of the transmission enclosure 46. The winch 34 is usable for drawing the vehicle A from a mud or bog hole or for hoisting timber or for loading the said vehicle A therewith, as is optional.

The rear power wheels 15 are shown in Figure 3 of the drawings, as driven through sprocket chain and sprocket gear connections 47 and 48, respectively, yet they may be otherwise operated, if found desirable. The vehicle A disclosed in Figures 1 to 4, inclusive, are shown of the three wheel type, the load being underslung beneath the frame 10 by releasable chain suspension mechanism, not shown. The load capacity beneath this frame 10 is of a wide range character, as will be seen best in Figure 3 of the drawings.

In Figures 5, 6 and 7 of the drawings there is shown a modification of the invention, wherein the main frame 49 is of uniform width, and preferably of substantially rectangular formation, having the side sills parallel with each other throughout the length of the said frame 49, while at the fore end of the latter and centrally located thereto at its longitudinal axis are upstanding bearings 50, which are spaced apart and have horizontally journaled therein a rocking shaft 51 supporting an inverted substantially U-shaped front axle frame 52, its vertical side arms 53 being provided on the outer side thereof with bearing ears 54 in which are fitted turning stems 55 of front steering axles 56 having journaled thereon front steering wheels 57, provided with pneumatic tires 58. The stems 55 at their upper ends are formed with turning cranks 59 having universal ball and socket joint connections 60 with a cross tie rod 61, which medially thereof has ball and socket connection 62 with a crank 63 on the fore end of a steering rod 64, the latter being journaled in the bearings 50. This rod 64 through meshing gearing 65 is operated by a turning shaft 66, which is suitably journaled in a bearing on the motor or unit 17, to have the hand wheel 67 of this shaft 66 in convenient reach of an operator of the vehicle when occupying the seat 68.

The rear power wheels 69 of the vehicle in its modified form are of the same arrangement as the wheels 15 of the vehicle A, so that a further description thereof is deemed unnecessary, as a full understanding of such arrangement should be had from the showing in Figure 3 of the drawings.

The vehicle of the modified form may be equipped with a winch cable and winch as hereinbefore described with respect to the vehicle A.

The load is to be underslung of the main frame 49 in a manner as hereinbefore described with respect to the vehicle A.

The front wheel frame must be hinged as described to allow for extreme flexibility of the vehicle without binding on the load, and also to prevent the front wheels from striking such load in making a turn either right or left, this flexibility being necessary in order to prevent body frame strain due to driving over rough and irregular ground.

The vehicle in its construction is self-propelled, thus permitting an over-all much shorter length thereto, and enables much shorter turning radius, as well as allowing quick and easy backing over log piles or the like for loading.

Another advantage of the invention is the increase of traction with the increase in load, the load being suspended ahead of the center line of the rear axle, together with the fact that the driving torque has a tendency to lift the front of the vehicle, throwing practically all the weight of the load, as well as the vehicle itself on the rear wheels, which are the power mediums therefor, the load suspension being far enough ahead of the rear axles to prevent the driving torque from raising the front end of the vehicle off the ground.

A further advantage of the invention is that the extra torque required for driving the vehicle with increased load is compensated by the load increase itself, due to the load being suspended ahead of the rear wheels or final drive transversal center. The vehicle is susceptible of climbing steep inclines, when heavily loaded.

From the foregoing it is thought that the construction and manner of operation of the invention will be clearly understood, and therefore, a more extended explanation has been omitted for the sake of brevity.

What is claimed is:

1. A vehicle of the character described comprising a chassis frame, depending elongated perpendicular housings fixed to the outside of said frame adjacent its rear end with their upper ends extending above the frame, a drive shaft extending transversely of said frame having its ends extending into the upper ends of said housings and supported thereby, a power unit connected with said drive shaft, wheel axles journaled in the lower ends of said housing and projecting laterally outwardly therefrom, wheels mounted on said axles, driving connections between said drive shaft and said wheel axles confined within said housing and a pivoted arched steering frame at the forward end of said frame supporting the forward end of the frame in the same horizontal plane as the rear end.

2. A vehicle of the character described comprising a chassis frame, depending elongated perpendicular housings fixed to the outside of said frame adjacent its rear end with their upper ends extending above the frame, a drive shaft extending transversely of said frame having its ends extending into the upper ends of said housings and supported thereby, a power unit connected with said drive shaft, wheel axles journaled in the lower ends of said housing and projecting laterally outwardly therefrom, wheels mounted on said axles, driving connections between said drive shaft and said wheel axles confined within said housings, a shaft mounted longitudinally of the forward end of said frame, an arched front axle pivotally mounted intermediate its ends on said shaft, and steering wheels rotatably mounted on the lower ends of said front axle.

JAMES E. BOWERS.

REFERENCES CITED

The following references are of record in the file of this patent:

UNITED STATES PATENTS

| Number | Name | Date |
| --- | --- | --- |
| 1,323,126 | Tolson | Nov. 25, 1919 |
| 1,436,999 | McLarty | Nov. 28, 1922 |
| 1,461,637 | Karl et al. | July 10, 1923 |
| 1,570,832 | Hasselberg | Jan. 26, 1926 |
| 1,586,042 | Kerst | May 25, 1926 |
| 1,616,295 | Yourtee | Feb. 1, 1927 |
| 1,761,828 | Haubert | June 3, 1930 |
| 1,961,513 | Gill | June 5, 1934 |
| 2,035,867 | Cross | Mar. 31, 1936 |
| 2,184,198 | Seeber | Dec. 19, 1939 |
| 2,187,425 | Johnston | Jan. 16, 1940 |
| 2,327,850 | Baker et al. | Aug. 24, 1943 |